(12) United States Patent
Tringali et al.

(10) Patent No.: US 11,561,834 B2
(45) Date of Patent: Jan. 24, 2023

(54) METHODS AND SYSTEMS FOR ADAPTIVE MEMORY-RESOURCE MANAGEMENT (71) Applicant: Rambus Inc., Sunnyvale, CA (US)

(72) Inventors: Joseph James Tringali, Los Altos, CA (US); Jianbing Chen, Plano, TX (US); Evan Lawrence Erickson, Chapel Hill, NC (US); Keith Lowrey, Garland, TX (US)

(73) Assignee: Rambus Inc., San Jose, CA (US)

( * ) Notice: Subject to any disclaimer, the term of this patent is extended or adjusted under 35 U.S.C. 154(b) by 318 days.

(21) Appl. No.: 16/743,271

(22) Filed: Jan. 15, 2020

(65) Prior Publication Data
US 2020/0225993 A1 Jul. 16, 2020

Related U.S. Application Data

(60) Provisional application No. 62/793,019, filed on Jan. 16, 2019.

(51) Int. Cl.
*G06F 9/50* (2006.01)
*G06F 9/54* (2006.01)
(Continued)

(52) U.S. Cl.
CPC .......... *G06F 9/5016* (2013.01); *G06F 9/542* (2013.01); *G06F 9/546* (2013.01);
(Continued)

(58) Field of Classification Search
CPC ........ G06F 9/5016; G06F 9/542; G06F 9/546; G06F 11/3037; G06F 12/0246;
(Continued)

(56) References Cited

U.S. PATENT DOCUMENTS 9,009,384 B2   4/2015  Nathuji et al.
9,251,090 B1   2/2016  Borthakur et al.
(Continued)

FOREIGN PATENT DOCUMENTS

WO   WO-2017105441 A1 * 6/2017 ........... G06F 3/0604

OTHER PUBLICATIONS

Larisa Stoltzfus et al., "Data Placement Optimization in GPU Memory Hierarchy usingPredictive Modeling", MCHPC Nov. 11, 2018, Dallas, TX, USA, 5 pages.
(Continued)

*Primary Examiner* — Gautam Sain
*Assistant Examiner* — Wei Ma
(74) *Attorney, Agent, or Firm* — Silicon Edge Law Group LLP; Arthur J. Behiel (57) ABSTRACT

Described are self-learning systems and methods for adaptive management of memory resources within a memory hierarchy. Memory allocations associated with different active functions are organized into blocks for placement in alternative levels in a memory hierarchy optimized for different metrics of e.g. cost and performance. A host processor monitors a performance metric of the active functions, such as the number of instructions per clock cycle, and reorganizes the function-specific blocks among the levels of the hierarchy. Over time, this process tends toward block organizations that improve the performance metric.

9 Claims, 4 Drawing Sheets

(51) Int. Cl.
   *G06F 12/02*     (2006.01)
   *G06N 20/00*     (2019.01)
   *G06F 11/30*     (2006.01)

(52) U.S. Cl.
   CPC ...... *G06F 11/3037* (2013.01); *G06F 12/0246* (2013.01); *G06N 20/00* (2019.01); *G06F 2212/7201* (2013.01)

(58) Field of Classification Search
   CPC ......... G06F 2212/7201; G06F 11/3034; G06F 11/3433; G06N 20/00; G06N 3/02
   USPC ....................................................... 711/162
   See application file for complete search history.

(56) References Cited

U.S. PATENT DOCUMENTS

| | | | | |
|---|---|---|---|---|
| 2005/0034136 A1* | 2/2005 | Engstrom | ............. | G06F 9/4843 |
| | | | | 719/328 |
| 2014/0281149 A1* | 9/2014 | Roberts | ................. | G06F 12/023 |
| | | | | 711/103 |
| 2014/0359248 A1* | 12/2014 | Peters | ................. | G06F 12/0223 |
| | | | | 711/171 |
| 2016/0077749 A1* | 3/2016 | Ravimohan | ........... | G06F 3/0688 |
| | | | | 711/103 |
| 2019/0095104 A1* | 3/2019 | Greenfield | ............ | G06F 3/0608 |
| 2019/0147364 A1* | 5/2019 | Alt | ........................ | G06F 3/0611 |
| | | | | 706/12 |
| 2019/0190805 A1* | 6/2019 | Hunt | ..................... | G06F 9/5011 |
| 2020/0293501 A1* | 9/2020 | Awasthi | ................ | G06F 3/0647 |

OTHER PUBLICATIONS

Yan Li et al., "CAPES: Unsupervised Storage Performance Tuning Using Neural Network-Based Deep Reinforcement Learning", published by ACM Nov. 12, 2017, 14 pages.
Wikipedia, "Hierarchical Storage Management," last edited Jun. 28, 2019, 4 pages.
Christoph Lameter, "NUMA (Non-Uniform Memory Access): An Overview," ACM Queue 2013, 12 pages.
Wikipedia, "Memory Hierarchy," last edited Sep. 22, 2019, 4 pages.
Wikipedia, "Non-uniform memory access," last edited Sep. 18, 2019, 5 pages.
Wikipedia, "Reinforcement learning," last edited Sep. 23, 2019, 10 pages.
Tao Xie et al., "An Empirical Study of Java Dynamic Call Graph Extractors," University of Washington Department of Computer Science and Engineering, Dec. 2002, 11 pages.

\* cited by examiner

METHODS AND SYSTEMS FOR ADAPTIVE MEMORY-RESOURCE MANAGEMENT

BACKGROUND

The performance and energy costs of processing within and across multi-processor computer systems vary dramatically in consequence of the shared memory resources. Processors can access local (physically close) memory considerably faster and more efficiently than non-local memory, such as storage that is local to another processor or shared between processors. Performance and power optimization are difficult in systems with many processors that have access to the same memory space.

BRIEF DESCRIPTION OF THE DRAWINGS

The present disclosure is illustrated by way of example, and not by way of limitation, in the figures of the accompanying drawings and in which like references refer to similar elements and in which:

FIG. 2 is a block diagram 200 of an embodiment of aspects of system 100 of FIG. 1 with like-identified elements being the same or similar.

DETAILED DESCRIPTION

Figure 1:
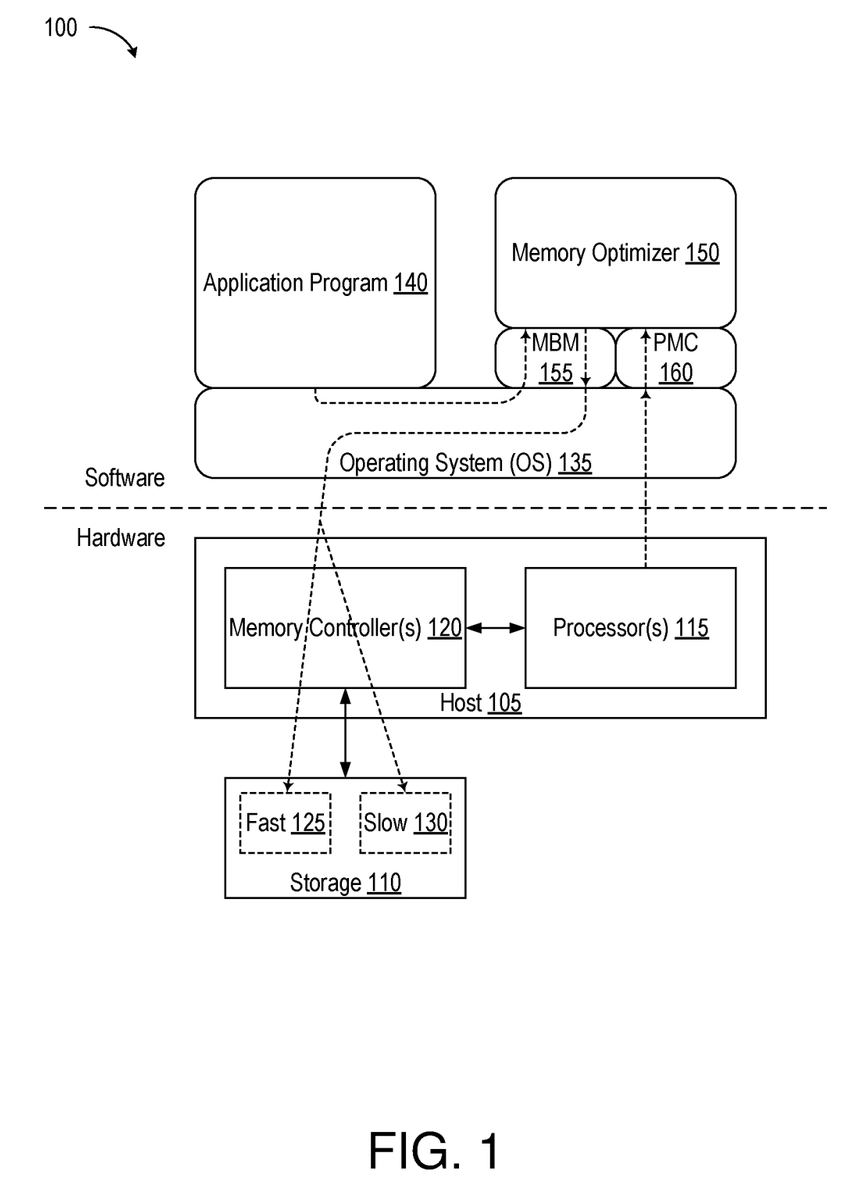
FIG. 1 depicts a computing system 100 that employs self-learning techniques for adaptive management of memory resources within a memory hierarchy of computer storage 110.

FIG. 1 depicts a computing system 100, which can consist of varying combinations of hardware and software, that employs self-learning techniques for adaptive management of memory resources within a memory hierarchy of computer storage 110. System 100 combines data associated with different active functions into blocks and organizes the blocks in different levels of the hierarchy. A host processor 105 (e.g., a memory controller and/or processing unit) monitors a performance metric or metrics of the active functions, such as the number of instructions per clock cycle (IPC), and initiates actions, such as reorganizing the blocks among the levels of the hierarchy in storage 110. Over time, this process tends toward block organizations that improve performance. System 100 thus employs reinforcement learning to optimize the way running computer application programs (applications) and their constituent functions are layered onto complex system topologies and non-uniform memory architectures.

In hardware, system 100 includes host 105 communicatively coupled to computer storage 110, a NUMA design in one embodiment. NUMA, for "non-uniform memory access," is a memory design that maximizes the proportion of local-memory accesses in multi-processor systems. NUMA provides separate memory for each processor, avoiding the performance hit when several processors attempt to address the same memory. To handle cases in which multiple processors require access to the same data, NUMA systems can support procedures for moving data between memories as needed. These procedures can dramatically slow the work of processors awaiting data movement.

Performance is also impacted by the mix of available memory resources. The speed performance of disparate levels and types of memory resources within a given system can vary by orders of magnitude. Energy use can likewise vary dramatically for different types of memory access. Some memory resources, such as flash memory commonly used in solid-state drives, are favored for cost and performance but have relatively low write endurance. That is, they tend to wear out when excessive writes are directed to a given address or set of addresses. Optimizing performance, efficiency, and endurance is extremely difficult across complicated network topologies. Scattering compute capacity across large data-center topologies compounds the problems of extracting cost-effective utilization out of the large capital investments made in data-center computation.

Ideally, each computer program would execute on a processor with access to fast, local memory. Unfortunately, computer programs generally require multiple processors with access to shared local and remote memory resources that satisfy different cost and performance tradeoffs. System performance is therefore considerably impacted by the manner in which running processes are divided across both processors and memory.

Computer operating systems can adopt policies that attempt to obtain a desired mix of performance, efficiency, and endurance for as many application programs as possible. Policy-based approaches to resource management in modern compute environments fail to tap into all the performance and capacity that these complex systems have available. Extracting the full computational capacity available on modern computing systems requires a level of expertise in system and processor architecture that is beyond the capability of most software developers. And even for those developers whose domain expertise is augmented by knowledge of system architectures, the complexity of modern hardware is such that the need for architecture-aware software optimizations consumes precious developer resources—resources that most organizations would rather spend on solving their own domain-specific problems.

Many organizations have invested a great deal of effort in optimizing software implementations for particular processor architectures. Workloads optimized for modern computing architectures typically employ flat, contiguous data structures and perform arithmetically dense computations on data in such a way that performance can benefit from spatial and temporal data locality. Such workloads and data layouts work well with the caching hierarchies and memory prefetchers in modern processors. However, important classes of data and workloads do not have the requisite characteristics to perform as well on current architectures. Irregular and discontiguous data structures provoke highly inefficient data movement in modern architectures, resulting in poor power/performance behavior. System 100 employs self-learning techniques for adaptive management of memory resources to address this problem.

Host 105 includes one or more processors 115 and corresponding memory controllers 120. Each processor 115 is or is part of one or more integrated circuits (ICs) that execute computer-program instructions. Controller 120, which can be on the same or a different IC than processor 115, manages the flow of data between processor 115 and storage 110. When a computer program executing on processor 115 requires access to storage, processor 115 issues a memory-allocation function call to memory controller 120 on behalf of the active program. Memory controller 120 decides where in storage 110 to place the requested allocation and directs that placement. Units of storage called for by an allocation request (aka "allocation units") vary in size.

Storage 110 is separated into a memory hierarchy. Memory hierarchies can be complex, involving many layers offering different combinations of cost, efficiency, durability, and speed performance. Although memory hierarchies can be more complex, a simple hierarchy comprising a first memory resource 125 exhibiting a high level of speed performance (a relatively fast memory) and a second memory resource 130 exhibiting a relatively low level of speed performance (a relatively slow memory) is shown for ease of illustration. Resources 125 and 130 can be the same or different types of memory. For example, the slower memory may be of a less expensive or more efficient variety or may be of the same type as the faster memory but farther away from host 105 to serve as relatively fast memory for another processor or processors. In NUMA systems, for example, each of multiple processors can have access to data within a local, shared memory resource that is remote, and therefore slower and less energy efficient, from the perspective of other processors. For example, memory that provides relatively fast and efficient data access (read and write) for a local processor may provide much slower and less efficient access for remote processors attached across 802.3 links running a TCP/IP or UDP protocol.

Considering the software side of FIG. 1 in this example, processor 115 executes two active computer programs, an operating system (OS) 135 and a third-party application program 140. In general, OS 135 manages the operation of system 100, whereas application program 140 performs coordinated functions for the benefit of a user. Examples of application program 140 include a web browser, a word processor, a media player, or a video game. The software additionally includes a memory optimizer 150 that communicates with OS 135 via functional elements called a metablock manager (MBM) 155 and a performance-metric collector (PMC) 160. MBM 155 provides memory optimizer 150 with feedback relating the location of data in the memory hierarchy and PMC 160 provides memory optimizer with measures of system performance. Memory optimizer 150 uses this information to learn how to allocate data between fast and slow memory resources 125 and 130 to improve system performance in executing application program 140.

All or part of memory optimizer 150, MBM 155, and PMC 160 can be implemented using general- or special-purpose hardware. Memory optimizer 150 can be remotely located or local to the hardware executing application program 140 and can service more than one operating system. In embodiments in which memory optimizer 150 executes on hardware remote from PMC 160, for example, data can be communicated to and from optimizer 150 via any suitable method or protocol (e.g., ethernet using TCP/IP or UDP).

OS 135 monitors memory-allocation requests from functions within application program 140. These requests are grouped into function-specific blocks, or "metablocks," that are references to logical collections of semantically related system resources (e.g. addresses of memory pages related by the function that called for allocation of the pages). Function-specific grouping into metablocks can be done using metadata such as the time of each allocation request and the object-allocation size. Each metablock specifies a group of memory pages, in this example, and serves as a record of how the corresponding function occupies physical memory space. Different functions produce different metablocks so each metablock is a signature for the corresponding function. Metablock size can be fixed or configurable. The physical addresses of pages common to a metablock are grouped in the same memory resource. The virtual addresses of the pages within a given metablock can vary widely.

Metablocks of the same size can include different numbers of allocated pages. The number of pages a metablock encompasses of a given program can become too large for efficient optimization. To illustrate the problem, a metablock that contained 75% of all pages allocated by an application would interfere with fine tuning of memory placement because pages of data are moved at the metablock level. Some embodiments thus divide metablocks that encompass too many pages of the same program into multiple metablocks to increase the granularity of page movement.

OS 135 supports a page-placement scheme that permits the physical address space of a program or function to be non-contiguous. A page allocated by OS 135 is placed in a NUMA node depending on the placement scheme. MBM 155 has access to memory-mapping structures of OS 135. By periodically parsing these structures, MBM 155 knows the locations of pages allocated to running functions. Programs are run in a mode that prevents OS 135 from moving pages autonomously after allocation, which ensures that MBM 155 retains a record of where all the pages are in storage 110.

MBM 155 passes metablock-state information to memory optimizer 150. The state information for each metablock indicates the locations of data allocations for the corresponding function in storage 110. Metadata considered in grouping by function can include the call stack, allocation time, allocation type, and allocation size for application program 140. The call stack for a given application program is a stack data structure that stores information about the active functions, or subroutines, of the program. The calling context, which is the sequence of active functions on the call stack at the time of object allocation, can be predictive of memory pressure.

Performance-metric collector 160 passes performance-state information to memory optimizer 150 indicating the contemporaneous system performance (e.g. speed, efficiency, or some desired combination thereof). In one embodiment, PMC 160 monitors the number of instructions per clock cycle (IPC) accomplished by processor 115 under the current memory allocation for the entirety of application program 140. In other embodiments PMC 160 monitors e.g. the ratio of local to remote accesses to memory as a metric to optimize. Access to local memory is generally faster than access to remote memory. The ratio of local to remote accesses can therefore be a reasonable analog for IPC. Other metrics of performance can be used to optimized for e.g. speed, efficiency, and endurance. In this context, a resource is "local" if physically installed with host 105 and "remote" if physically remote from the host and accessed over a network (e.g. Ethernet, Fiber channel or QPI) shared by two or more hosts. In this context, the term "network" includes the processor-to-processor networks that exist in NUMA systems.

Memory optimizer 150 correlates the metablock-state information with the performance-state information, periodically issuing instructions to MBM 155 to migrate metablocks of storage for program 140 to different addresses within storage 110. MBM 155 encodes these instructions into calls recognizable by the system page-migration application programming interfaces (APIs) of OS 135. The program data stored within the function-specific blocks of allocation units are thus moved between alternative and disparate memory resources (e.g., between relatively fast and slow memory resources 125 and 130). Memory optimizer 150 thus periodically tries metablock migrations to learn metablock organizations that improve the performance metric(s) from PMC 160. Function-specific blocks of allocation units are thus preferentially written to alternative ones of the disparate memory resources responsive to a performance metric(s) of the active functions of application program 140. Subsequent execution of functions that produce similar metablocks, and thus similar inputs to memory optimizer 150, can thus result in performance-optimized memory allocations without modifying application program 140.

Memory optimizer 150 may, for example, reorganize metablocks of data allocated to functions of application program 140 to various regions in storage 110 to maximize e.g. the IPC for program 140. Memory optimizer 150 may rearrange the virtual-to-physical mapping of memory addresses employed by functions called by application 140 to increase the IPC values from processor 115 for those functions. Subsequent execution of application 140 would generate a similar set of metablocks from which memory optimizer 150 would divine the previously learned memory optimization.

Figure 2:
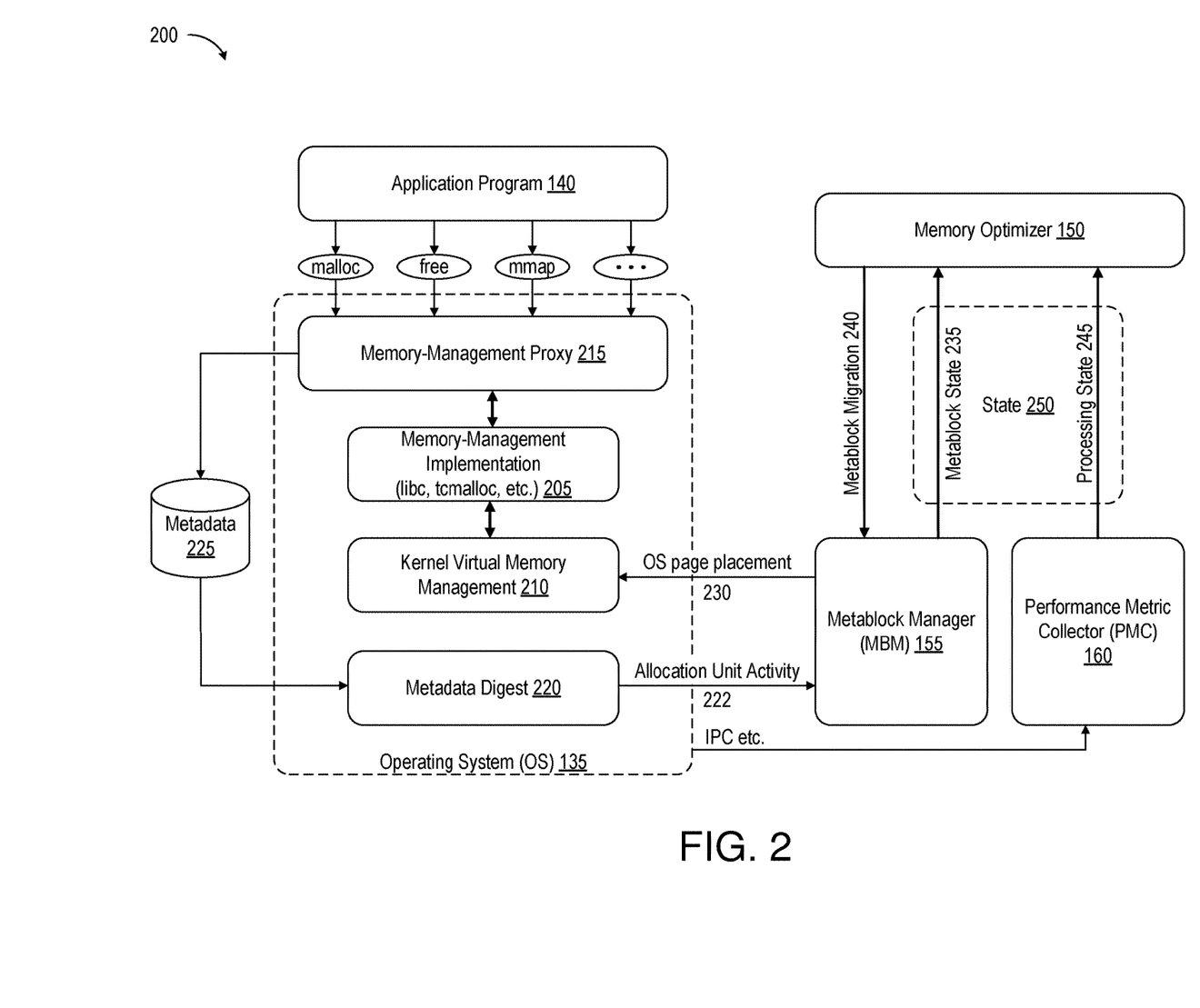

In one embodiment, memory optimizer 150 executes a machine-learning algorithm that can be implemented using TENSORFLOW, an open-source software library that supports machine-learning applications. FIG. 2 is a block diagram 200 of an embodiment of the software running on system 100 of FIG. 1 with like-identified elements being the same or similar. OS 135 supports a memory-management implementation 205, such as TCMalloc (for "thread-cache memory allocation") or libc (the C standard library) for the C programming language. OS 135 additionally supports a kernel 210 for virtual-memory management, a kernel being a computer program at the core of OS 135. Suitable memory-management implementations and kernels for virtual-memory management are well known to those of skill in the art so a detailed discussion is omitted.

OS 135 is equipped, in this embodiment, with a memory-management proxy 215 and a metadata digest 220. Proxy 215, between application program 140 and memory-management implementation 205, inspects memory-allocation requests from application programs and passes or allows them to be passed to implementation 205 for traditional processing by OS 135. Proxy 215 records the requests and request-specific metadata in local storage 225 reserved by OS 135 for this purpose. In one embodiment the metadata includes the time and object allocation size of each allocation request. The metadata can be taken from the call stack, at allocation time, for application program 140. The call stack for a given application program is a stack data structure that stores information about the active functions, or subroutines, of the program. The sequence of active functions on the call stack at the time of object allocation, the "calling context," can be predictive of memory pressure.

Proxy 215 produces a considerable quantity of metadata 225. In one embodiment digest 220 integrates metadata 225 to periodically produce net measures of allocation-unit activity 222; for example, digest 220 can provide a net number of allocations and deallocations that occur over a one-second interval along with the metadata associating the net allocations to different active functions. The selected interval can be different or variable.

MBM 155 groups the net-allocation metadata by function and assigns the grouped data allocations into function-specific metablocks. Organizing memory allocation by function allows data placement operations to take place on pages sharing similar application-induced memory attributes. For certain classes of applications, object allocation size, call stack at allocation time, or both are predictive attributes for subsequent memory access intensity. MBM 155 can use one or both of these attributes to express a metablock state 235 that informs the way memory pages are grouped into metablocks. Another example of a "memory range attribute" that could be used is "last access time." Metablock state 235 can be a metablock number and corresponding NUMA node, in one embodiment expressed as two vectors indexed by metablock number; one vector holds the virtual address ranges within a given metablock number and the other holds the node assignment—e.g. relatively fast memory resource 125 or slow memory resource 130—for the given metablock.

Memory optimizer 150 receives system state 250 as the combination of metablock state 235 and processing state 245. Metablock state 235 indicates the locations of the various function-specific blocks of pages within the memory hierarchy and processing state 245 provides a measure of performance (such as IPC) to be optimized for each active function. Other measures of performance include, for example, the number of writes or the write bandwidth for memory that may suffer relatively low endurance. For example, memory optimizer 150 could monitor the density of write traffic to blocks of non-volatile memory, swapping high-usage blocks with lower-use blocks to reduce wear and thus improve memory endurance.

Memory optimizer 150 employs a reinforcement-learning algorithm to feed metablock-migration instructions 240 to MBM 155. MBM 155 encodes these instructions into page-placement calls 230 recognizable by the system page-migration application programming interface (APIs) of OS 135. Over time, memory optimizer 150 learns to migrate the locations of metablocks in storage to maximize the performance metric. Performance can be optimized for the overall system, or for individual application programs or functions, without modifying the application programs of functions.

Figure 3:
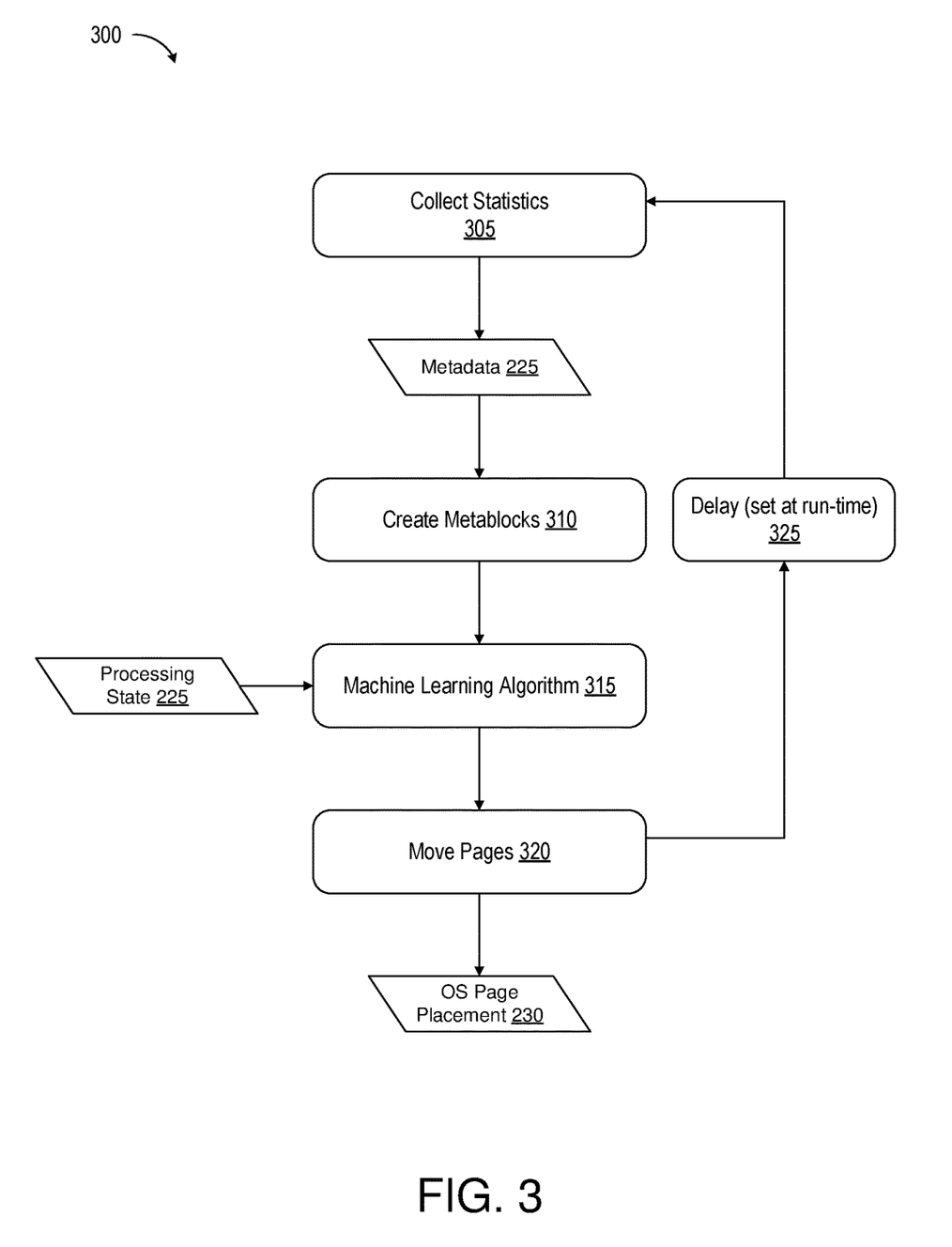
FIG. 3 depicts a control loop 300 incorporating a neural network (NN) based policy that uses measures of memory state and patterns of execution (e.g. of target application program 140) to issue commands generating OS state changes as outputs.

FIG. 3 depicts a control loop 300 incorporating a neural network (NN) based policy that uses measures of memory state and patterns of computer-program execution (e.g. of target application program 140) to issue commands generating OS state changes as outputs. System 100 executes control loop 300 in one embodiment to allocate data from active functions of a target computer program among disparate types and levels of memory resources in system 100 to maximize IPC for improved speed performance. Control loop 300 can allocate data responsive to different metrics of interest, such as to reduce write density or power consumption. Combinations of metrics can also be used. For systems that suffer wear, for example, IPC may be of highest priority for read operations and de-prioritized relative to write density for write operations.

Beginning at step 305, OS 135 employs proxy 215 to monitor program 140 for memory-allocation function calls. For example, memory allocation in the C programming language supports memory allocation functions "malloc" and "free"; "malloc" allocates a number of bytes specified by the malloc command, while "free" specifies a block of memory for release back to the system. Using these and other commands, application program 140 dynamically allocates free memory in storage 110. Program 140 can, for example, access a requested block of memory in storage 110 via a pointer that malloc returns. When this allocation is no longer needed, program 140 passes the same pointer to OS 135 with function free to deallocate (free) the block of memory.

Other embodiments capture more or different types of allocation function calls, from e.g. malloc to mmap to temporal strings used to print characters to a screen and more. The collections of allocations can be limited to allocations that are expected to last a relatively long time and not simply hold text. System 100 can scrape data for all pages allocated to a program and optimize page placement regardless of where in storage 110 the allocated pages are located. One embodiment captures metablocks that contain pages for which allocating function calls were missed so that page placement could still be optimized. Pages can be missed because e.g. the memory was allocated before control loop 300 could fully load, the calling functions were not considered by proxy 215, etc.

Proxy 215 records, as metadata 225, memory-allocation requests with request-specific metadata, such as when the allocation was done in the context of the target program, the size of the allocation, the time at which the allocation occurred, and the allocation's temporal proximity to other allocations. These data can be extracted by viewing the call graph for application program 140. Digest 220 reduces and synthesizes the metadata by periodically producing net measures of allocation-unit activity; for example, digest 220 can provide a net number of allocations and deallocations that occur over an interval of e.g. one-second along with the metadata associating the net allocations to different active functions. The resultant summary of allocation-unit activity 222 is passed to MBM 155.

MBM 155 monitors the allocation-unit activity from digest 220. In this example, MBM 155 monitors application program 140 for memory-allocation function calls that request allocation units of memory pages within storage 110. MBM 155 groups the allocation units into function-specific metablocks (step 310), each metablock providing a record of how the corresponding function occupies memory space. MBM 155 uses a combination of object allocation size and the call stack at allocation time to express a metablock state 235 that informs the way memory pages are grouped into metablocks. Allocation size and the call stack are, for certain classes of application, predictive attributes for subsequent memory access intensity, and can therefore be used to optimize memory performance.

MBM 155 passes metablock state 235 to memory optimizer 150, which uses metablock state 235 and processing state 245 as inputs to a machine-learning engine that issues metablock-migration instructions 240 (step 315) to maximize whatever performance objectives are reflected in processing state 245 by writing function-specific metablock of allocation units (e.g. a page or pages) into alternative one of fast and slow regions 125 and 130 in storage 110.

The policy implemented by control loop 300 can optimize for one or a combination of metrics, such as processing speed, power efficiency, or write density. In step 320, MBM 155 encodes instructions 240 into calls to OS 135 (230) to move the pages associated with metablocks between fast and slow regions 125 and 130 in storage 110. Different actions might be taken for optimizations to e.g. reduce write traffic. Control loop 300 repeats after a configurable delay (325) set at run time. Over time, memory optimizer 150 learns metablock organizations that improve the performance metric(s) from PMC 160.

Pages moved in step 320 are expected to improve measures of performance based on previous leanings. Processing state 225, the action taken (e.g. page movement), and the reward received (e.g. an increase in IPC) are captured in a rolling buffer (not shown) for replay during training. After a configurable number of repetitions through control loop 300, memory optimizer 150 is trained using a randomly selected set of experiences from the rolling buffer and updated in a way that is expected to maximize a future reward.

Figure 4:
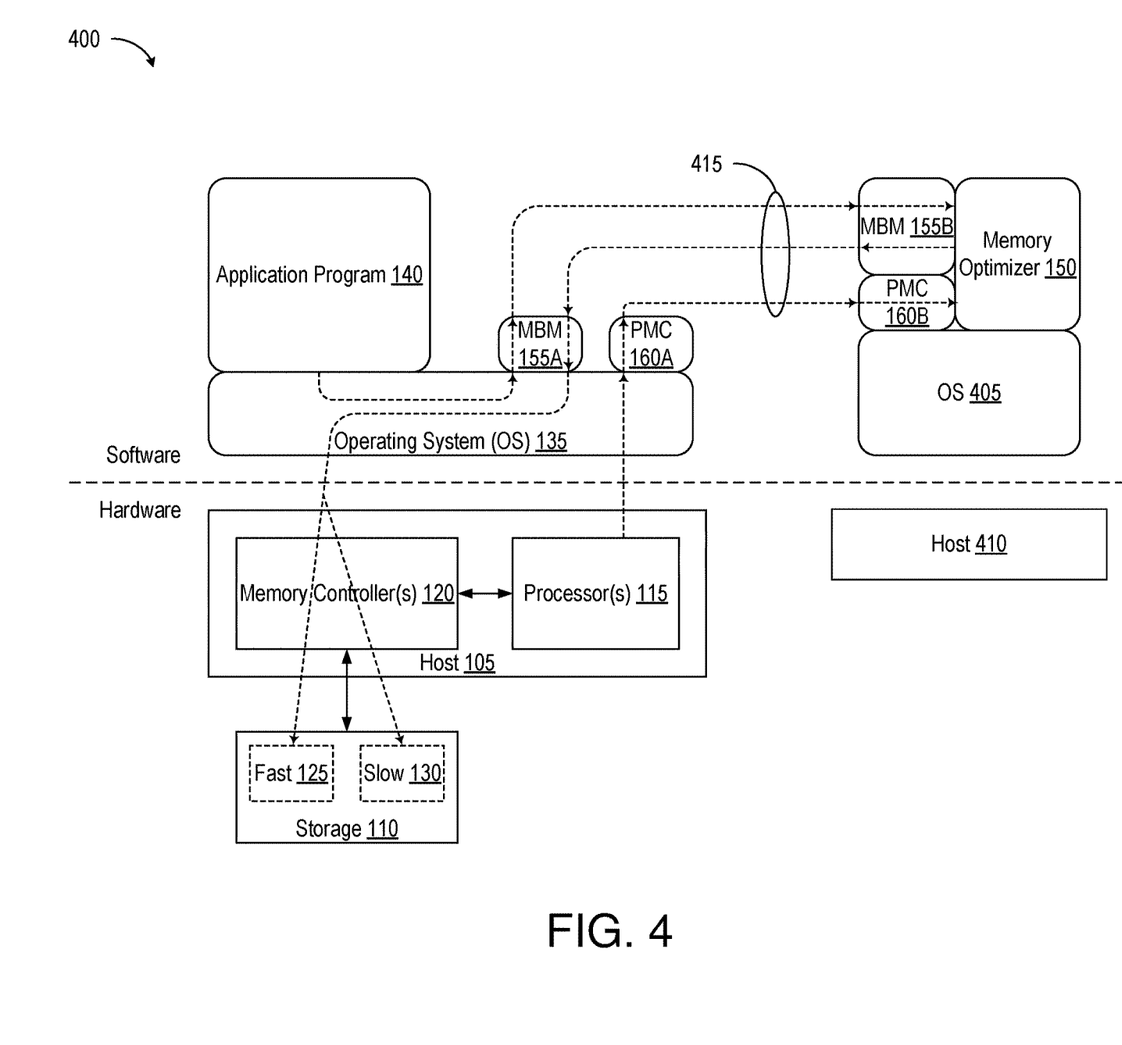
FIG. 4 depicts a computing system 400 that employs self-learning techniques for adaptive management of memory resources.

FIG. 4 depicts a computing system 400 that employs self-learning techniques for adaptive management of memory resources. System 400 is in some ways like system 100 of FIG. 1, with like-identified elements being the same or similar. Rather than co-locate memory optimizer 150, MBM 155, and PMC 160 on the same machine, however, some of the functionality provided by those processes executes with a supporting OS 405 on hardware that is remote from host 105. In this example, memory optimizer 150 executes on a host 410, while MBM 155 and PMC 160 are split among the two hosts as MBM 155A/B and PMC 160A/B with connections 415 extending between them. MBM 155A and PMC 160A use hooks to interact with OS 135 on host 105, whereas MBM 155B and PMC 160B use hooks to OS 405 to interact with remote host 410. For example, the grouping of metablocks based on allocation-unit activity can be handled by MBM 155B on host 410, leaving MBM 155A to issue OS page-placement calls 230 to execute on local host 105. In this example, connections 415 represent communication paths tunneling through e.g. a network or socket connection between local (to host 105) and remote (from host 105) agents. Connections 415 can comprise an ethernet connection that allows the partitioned MBM 155A/B and PMC 160A/B to communicate via TCP/IP or UDP.

The forgoing memory-optimization system can be implemented using different combinations of hardware and software; however, some level of hardware and system support for energy-efficient, high-resolution observations of memory allocation is beneficial. Moreover, these systems can be used for other system optimizations, such as virtual machine or container placement in cloud computing environments, and some or all of the memory-optimization components can be disaggregated from the system or systems being optimized. Still other variations will be evident to those of skill in the art. For example, though only one processor is shown, the term "processor" should be read to include one or more integrated circuits capable of independently or collectively performing the various functions ascribed herein to a processor. The same holds for e.g. memory controllers, memory levels, and memory devices. Therefore, the spirit and scope of the appended claims should not be limited to the foregoing description. Only those claims specifically reciting "means for" or "step for" should be construed in the manner required under the sixth paragraph of 35 U.S.C. § 112.

What is claimed is:

1. A system for improving performance in executing an application program, the system comprising:
   a first memory resource and a second memory resource; and
   a host processor communicatively coupled to the memory resources via one or more interfaces;
   the host processor to:
      receive a memory-allocation function call from the application program to allocate storage for data;
      allocate the storage for the data in the first memory resource;
      write the data to the first memory resource;
      access the data within the first memory resource;
      generate a measure of performance for accessing the data;

use a machine-learning engine to determine to move the data from the first memory resource to the second memory resource responsive to the measure of performance;

issue memory-allocation instructions on behalf of the application program to the first and second memory resources to move the data from the first memory resource to the second memory resource based on the determination; and issue memory-allocation function calls responsive to the determination and without modifying the application program.

2. The system of claim 1, further comprising a proxy executing on the host processor to store metadata descriptive of the memory-allocation function calls.

3. The system of claim 2, wherein the host processor issues the memory-allocation instructions responsive to the memory-allocation function calls.

4. The system of claim 2, further comprising a digest communicatively coupled to the proxy to periodically summarize the memory-allocation function calls.

5. The system of claim 4, further comprising a metablock manager executing on the host processor and coupled to the digest, the metablock manager to group the memory-allocation function calls into metablocks, wherein a metablock specifies addresses of the data for at least one function of the application program.

6. The system of claim 5, wherein the metablock manager conveys the metablocks to a memory optimizer executing on the host processor.

7. The system of claim 6, wherein the memory optimizer executing on the host processor moves the data for the at least one function of the application program from the addresses of the data in the first memory resource to second addresses in the second memory resource.

8. The system of claim 1, wherein the first memory resource is local to the host processor and the second memory resource is remote from the host processor.

9. The system of claim 1, wherein the measure of performance comprises a number of instructions executed per cycle by the host.

* * * * *